United States Patent
Sperry

[19]

[11] Patent Number: 6,131,375
[45] Date of Patent: *Oct. 17, 2000

[54] APPARATUS FOR PRODUCING FOAM CUSHIONS UTILIZING FLEXIBLE FOAM MIXING CHAMBER

[75] Inventor: Charles Richard Sperry, Northhampton, Mass.

[73] Assignee: Sealed Air Corporation (US), Duncan, S.C.

[*] Notice: This patent is subject to a terminal disclaimer.

[21] Appl. No.: 09/038,396

[22] Filed: Mar. 11, 1998

Related U.S. Application Data

[63] Continuation of application No. 08/667,421, Jun. 21, 1996, Pat. No. 5,727,370.

[51] Int. Cl.7 .............................. B65B 9/06; B65B 23/00; B65B 55/20
[52] U.S. Cl. .................. 53/472; 53/122; 53/237; 53/451; 53/474; 53/551
[58] Field of Search .............................. 53/472, 474, 451, 53/552, 551, 423, 122, 561, 238, 239, 237, 506, 505

[56] References Cited

U.S. PATENT DOCUMENTS

| | | | |
|---|---|---|---|
| 4,938,007 | 7/1990 | Sperry | 53/472 X |
| 4,996,819 | 3/1991 | Davis | 53/506 X |
| 4,999,975 | 3/1991 | Willden et al. | 53/472 X |
| 5,149,065 | 9/1992 | Willden et al. | 267/136 |
| 5,376,219 | 12/1994 | Sperry et al. | 156/515 |

*Primary Examiner*—James F. Coan

[57] ABSTRACT

A protective foam cushion-making apparatus dispenses reactive foam components into an interior space between two panels of plastic film to form protective foam cushions. The apparatus includes a supply of plastic film and a film a driving assembly, such as two pliable rollers. A foam component dispensing assembly is interposed between the film panels and injects reactive foam components into the interior space where they are mixed together to form a mass of expandable foam. The plastic film forms a flexible mixing chamber in the area between the two pliable rollers in which the reactive foam components are mixed together after they are dispensed from the foam dispensing assembly.

34 Claims, 6 Drawing Sheets

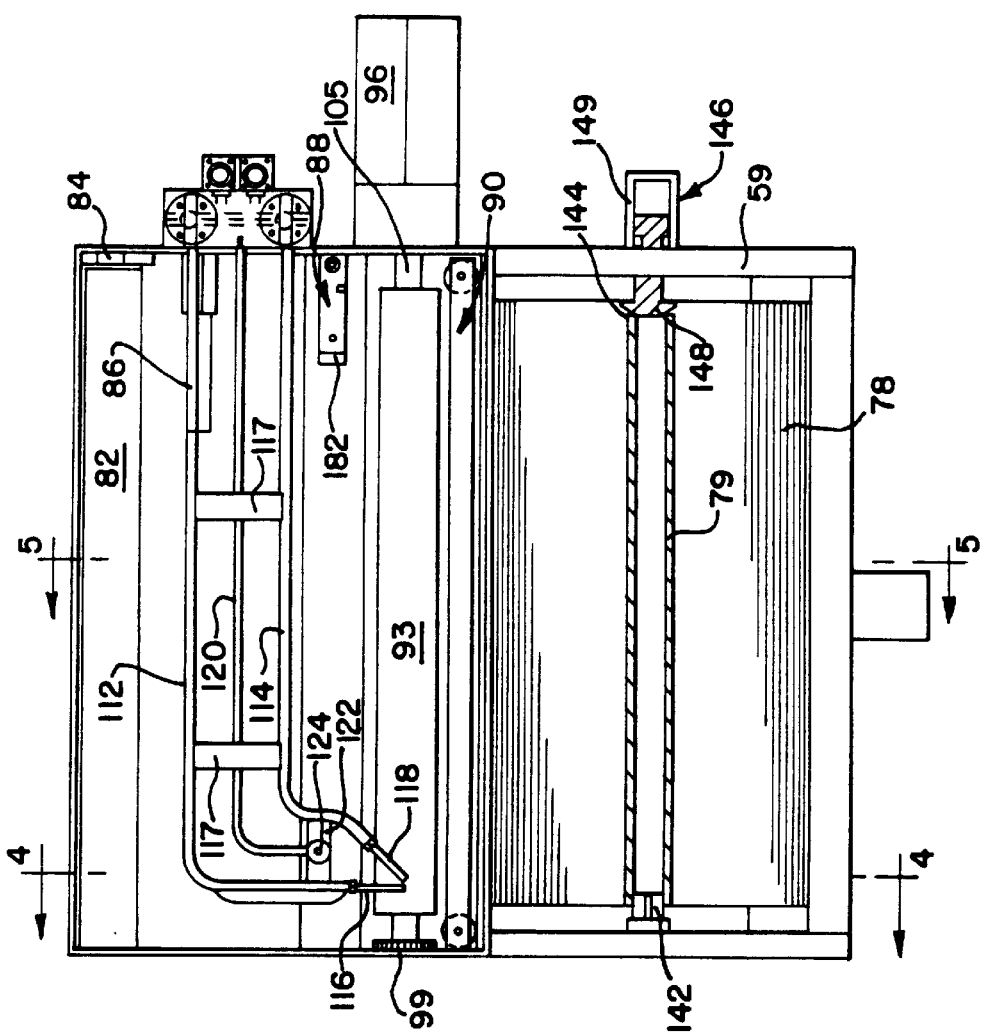
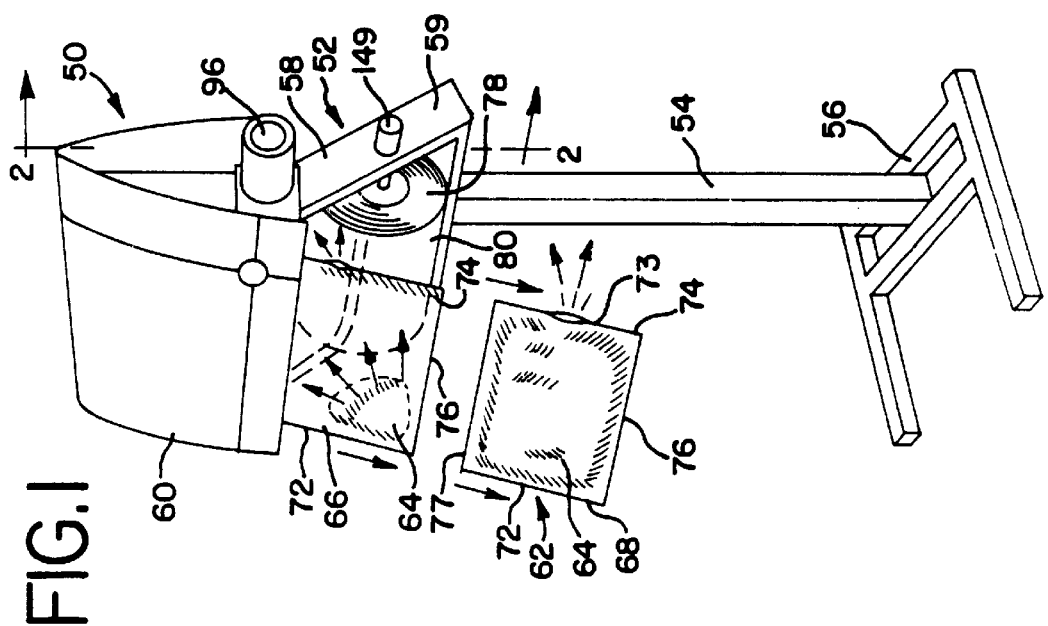

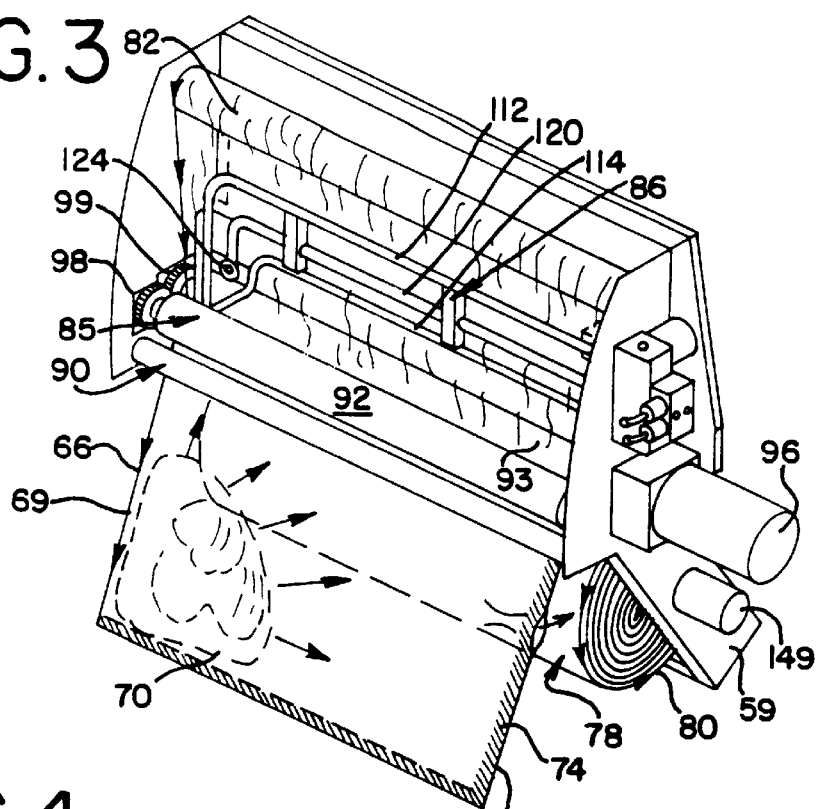
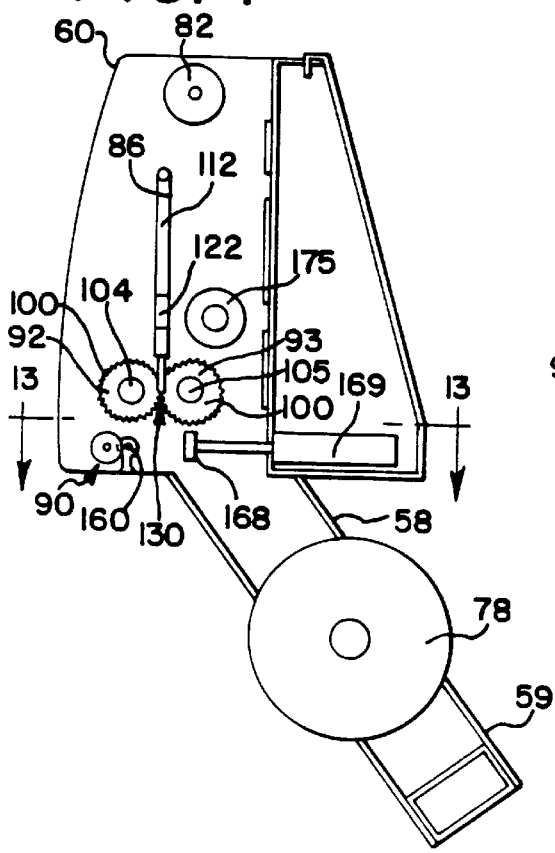
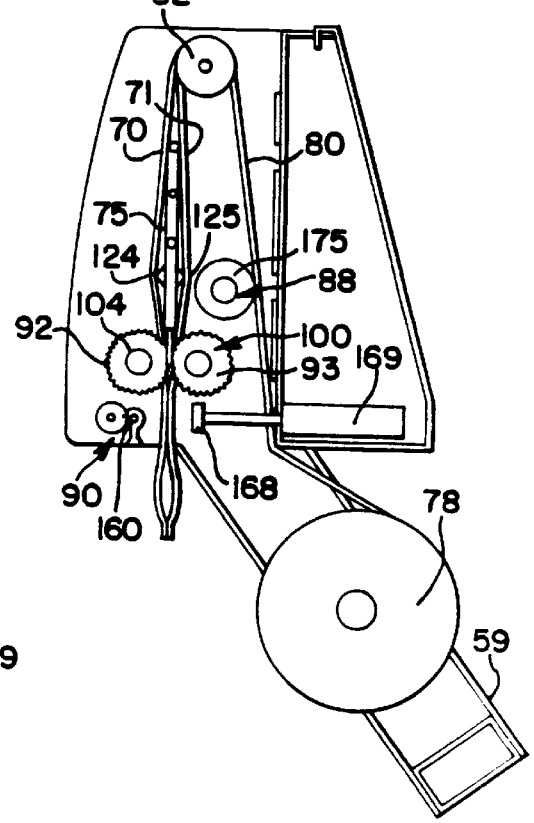

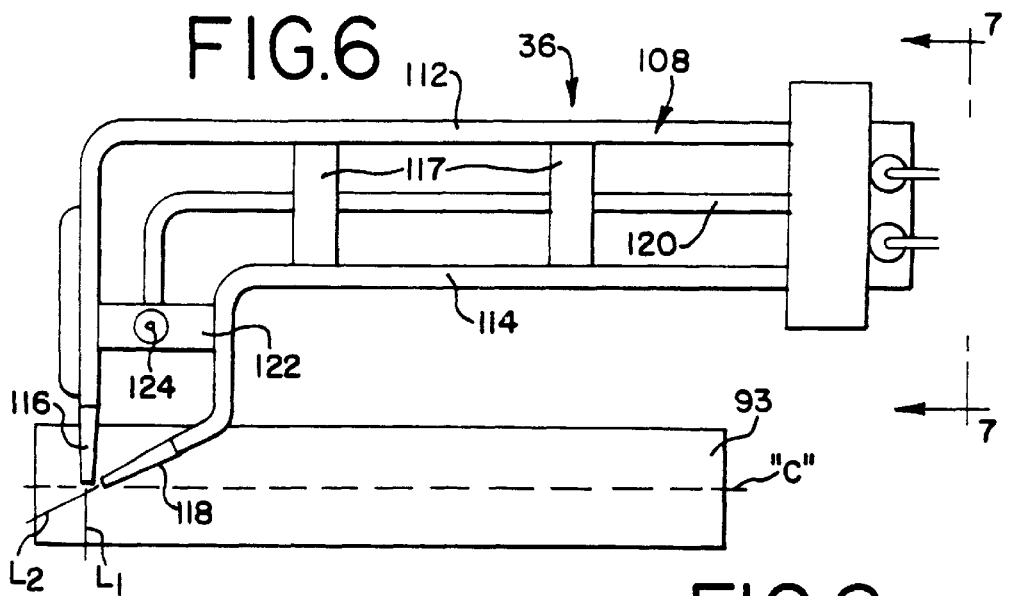
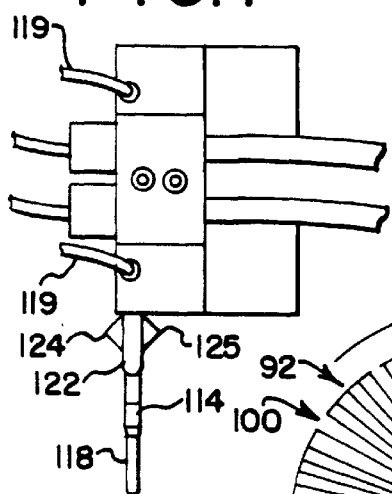
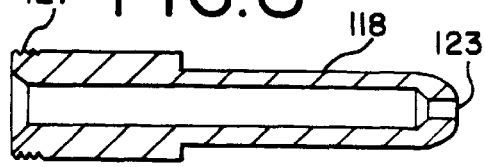
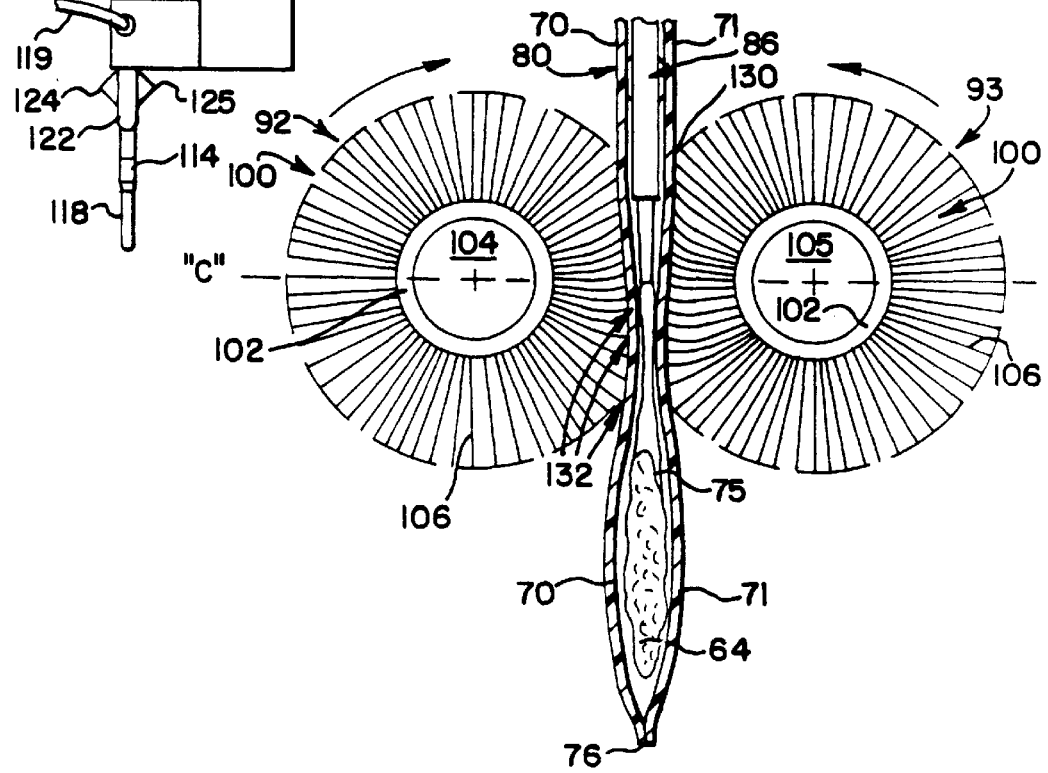

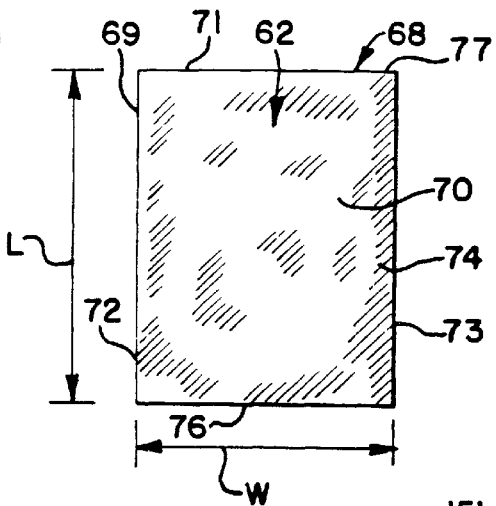
FIG. 10
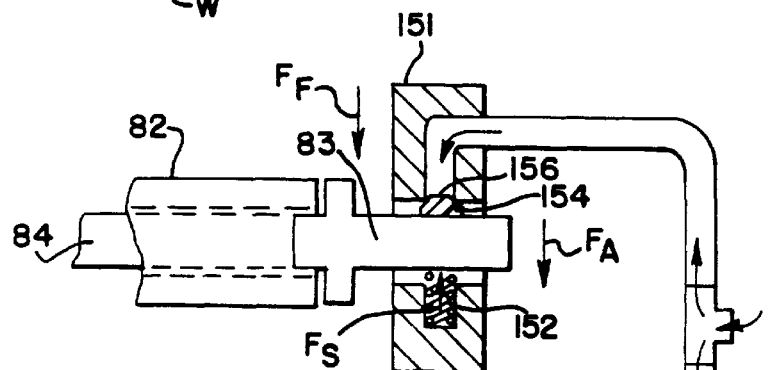
FIG. 11
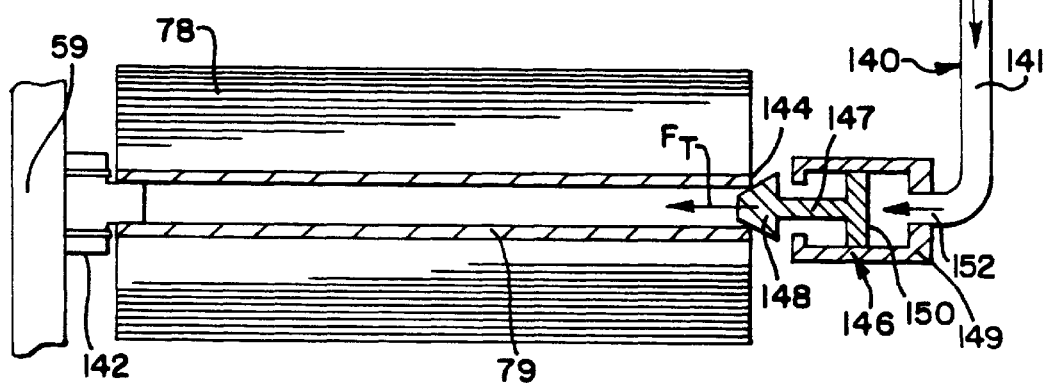
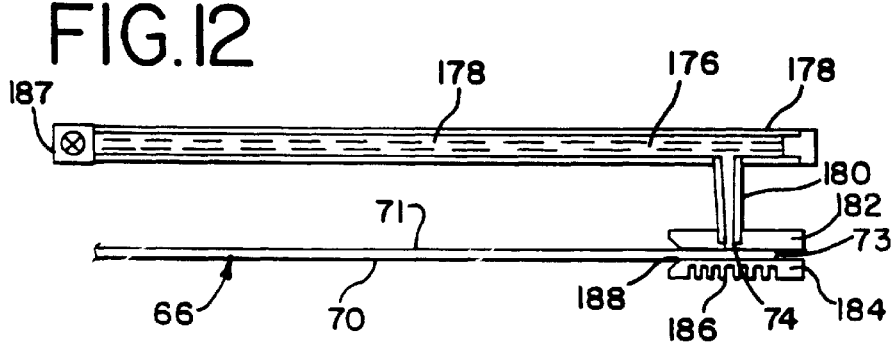
FIG. 12

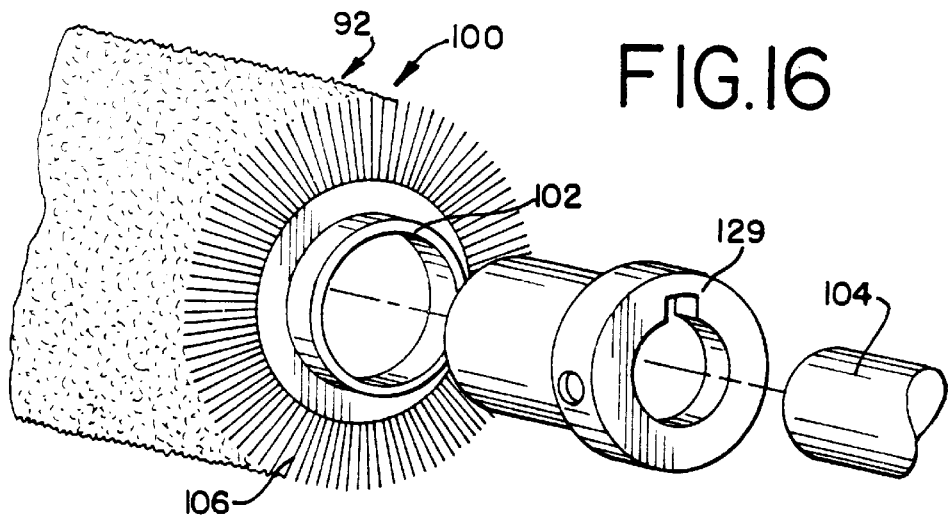
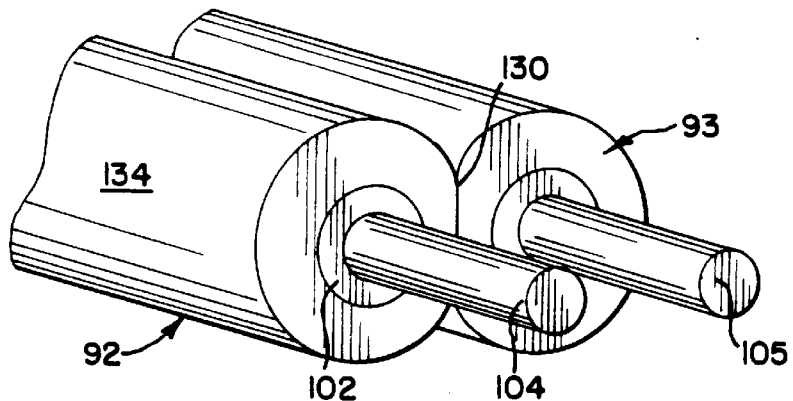
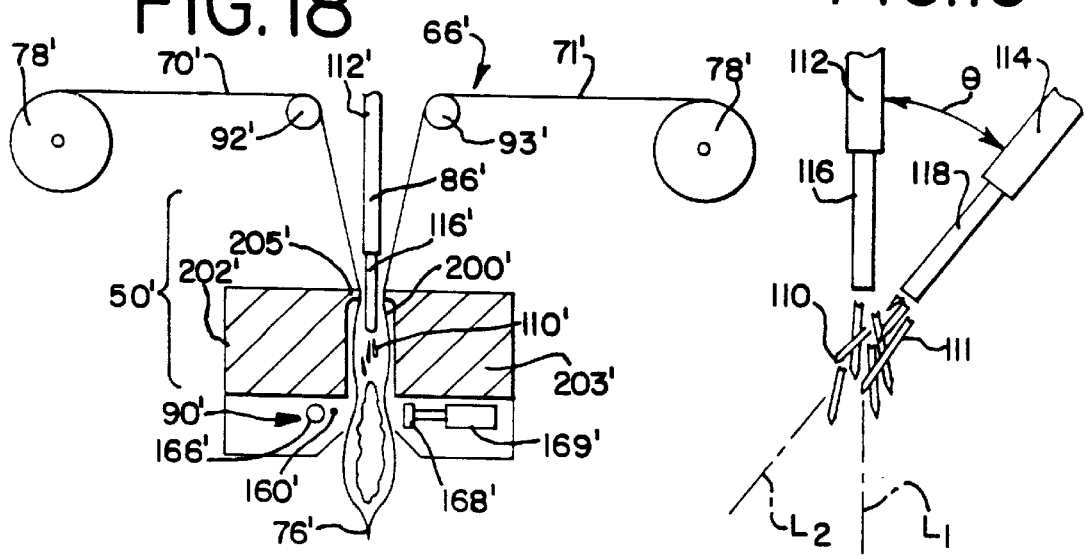

APPARATUS FOR PRODUCING FOAM CUSHIONS UTILIZING FLEXIBLE FOAM MIXING CHAMBER

This is a continuation of Ser. No. 08/667,421, filed Jun. 21, 1996 now U.S. Pat. No. 5,727,370.

BACKGROUND OF THE INVENTION

The present invention relates generally to apparatus and methods for forming individual foam-filled bags commonly used as protective cushions in the packaging arts. More particularly, the present invention relates to apparatus and methods for forming such protective cushions by dispensing two streams of reactive foam components between opposing panels of a flexible sheet material and mixing the streams together therebetween in order to produce an expandable foam between the panels.

In the packaging industry, expandable foams have been used for some time to form protection for packaged articles. Conventional practice in such industry has included filling a cardboard box with an expandable foam, such as a urethane or polyurethane foam, and contacting the foam with a plastic barrier sheet to create a protective cushion and then placing an article for shipping into the box on the cushion. The article may then also be covered with another plastic sheet and a second filling of expandable foam accomplished before closing the box.

Another practice in the industry utilizes foam cushions which are inserted into the packing box immediately after the foam cushions are made. This is accomplished by machines which react two foam components together in a gun apparatus and then dispense the foam so formed between two opposing plastic sheets, and seal the edges to form a protective foam cushion. Numerous patents exist which describe such methods and apparatus. Two such patents, U.S. Pat. No. 4,999,975, issued Mar. 19, 1991 and U.S. Pat. No. 4,800,708, issued Jan. 31, 1989 describe apparatus for foam cushion making in which a foam dispenser, or gun, is positioned between two opposing plastic panels. Two different reactive foam components, commonly referred to as foams precursors, are mixed together in the foam gun in order to form the foam, which is then dispensed under pressure between the two opposing plastic panels to form the foam protective cushions.

Although such apparatus and methods are operational and produce protective foam cushions which adequately provide protection to packaged articles, they are not without certain inherent disadvantages. For example, they reply upon a mixing chamber or cartridge in the foam gun to provide an area wherein the foam components are mixed together to form the expandable cushioning foam. Once formed, the foam is then dispensed under pressure through a nozzle downstream of the mixing chamber. The mixing chamber typically accumulates hardened foam over time and thus must be cleaned at regular intervals, typically at weekly intervals. The apparatus must then be taken apart to be cleaned, thereby leading to detrimental downtime of the apparatus.

Other apparatus rely upon a complex foam dispensing gun structure which utilizes two ports to convey the two reactive foam components to a mixing chamber preceding the dispensing end of the gun. In this type apparatus, the mixing chamber may include a valving rod which slides in and out of the mixing chamber to control the flow of at least one of the reactive foam components. This type of apparatus is also not without certain disadvantages, for although the valving rod effectively acts as a valve to control the flow of the reactive foam components into the mixing chamber, the foam formed by the reactive components has been known to slowly build up in the mixing chamber and on the valving rod itself. Additionally, when a valving rod is used, "crossover" between the foam components may occur when one of the foam components accumulates on the valving rod and makes contact with into the other foam component as the valving rod slides back and forth to form a reacted, hardened foam. The valving rod then must be cleaned, which typically requires scraping the accumulated foam off of the valving rod. Each cleaning wears down the tolerance of the rod to eventually wear down the overall effectiveness of the foam dispensing gun of these devices.

In order to prevent the buildup of foam in the mixing chamber and dispensing nozzles of the aforementioned apparatus, solvent systems which continuously dispense solvents through the foam dispensing systems used therein in order to maintain them in a clean state. These solvent systems increase the complexity and cost of the apparatus.

The present invention is directed to an apparatus and methods for producing foam cushions which overcomes these disadvantages.

SUMMARY OF THE INVENTION

In an apparatus and in methods according to the present invention, foam cushion-making apparatus and methods are characterized by an entirely different and new foam dispensing assembly which represents a significant departure from the prior art in that the present invention does not utilize any foam dispensing gun or assembly which has a mixing chamber in which reactive foam components are first mixed and then dispensed into a bag which encloses the mass of expandable foam.

Rather, the present invention represents a quantum leap in the foam cushion-making arts by creating a flexible mixing chamber formed by the opposing panels of the plastic film itself which encloses the foam cushions made with the apparatus. This flexible mixing chamber removes the mixing area completely from the foam dispensing assembly where it must be periodically removed and cleaned and places the mixing area within the bag, thus avoiding time-consuming cleanings and maintenance shutdowns. This relocation also eliminates the need for a solvent system associated with the foam dispensing assembly to maintain it in a clean state.

The novel relocation of the mixing area by the present invention outside of the foam dispensing gun and entirely within the opposing panels of the bag which encloses the foam cushion leads to virtually flawless foam dispensing by the apparatus and increased reliability and efficiency of operation.

In one principal aspect of the present invention, a foam cushion-making apparatus includes a film supply in the form of a continuous plastic web folded upon itself to define a partial flexible envelope having two opposing film panels interconnected at one marginal edge by the fold of the film. The envelope is advanced through the apparatus by a film driving means across a foam dispensing assembly so that the opposing film panels of the envelope are drawn across opposite sides of the foam dispensing assembly. The foam dispensing assembly extends into the film driving means and separately dispenses two reactive foam components into the space between the film panels to form an expandable foam mass therebetween.

In another principal aspect of the present invention and as exemplified in one embodiment, the film driving means includes a driving roller and a driven roller which contact each other at a nip or interference chord. The opposing film panels of the flexible envelope pass across the foam dispensing assembly and through this nip where they are contacted in driving engagement by the rollers of the film driving means. The nip of the rollers provides support for a flexible mixing chamber adjacent the rollers and also resists the backpressure developed by the reacting foam components. The nip and the rollers cooperate to maintain the foam components within the flexible mixing chamber and the rollers assist in the mixing of the foam components together in the flexible mixing chamber. In a unique and remarkable departure from the prior art, the film opposing panels act as walls of the flexible mixing chamber as they pass through the film driving means and subsequently act as the outer bag of the protective foam cushion as they pass downstream of the film driving means.

In still another principal aspect of the present invention and as exemplified by one embodiment of the invention, the film driving means rollers includes a pair of counter-rotating brushes having a plurality of brush elements, such as hairs or fibers disposed thereon which extend along the length of the rollers in the areas thereof which contact the film panels. The brushes contact the opposing film panels of the envelope as they pass therebetween and provide support to the opposing film panels of the flexible mixing chamber, while they assist in mixing the reactive foam components together. Additionally, the brushes may be formed from anti-static material to reduce film static and to provide tautness across the length of the film.

In still another principle aspect of the present invention, a rigid support may be provided for the flexible mixing chamber which utilizes one or more rigid members having an opening through which the opposing film panels pass. The foam dispensing assembly extends into this opening between the opposing panels and the foam reactive components are injected into the interior space between the opposing film panels.

In yet another principal aspect of the present invention, the film driving means utilizes a differential driving arrangement to achieve the film through the apparatus wherein the film driving means operates at a faster rate than the film in order to straighten out any wrinkles which may develop in the film as it passes through the apparatus.

The panels of the plastic film are folded upon each other in face-to-face contact in the preferred embodiment and thus the possibility exists that the opposing film panels may shift out of alignment along one of their mating edges or one of the panels may remain flat, while the other becomes wrinkled or crumpled. In order to avoid this problem, the present invention incorporates a novel film tensioning means to apply tension to the film web during operation. This film tensioning means operatively interconnects the film supply roll with an idler roller over which the film passes as it pays out from the film supply roll on its way to the film driving means so that there is always a predetermined amount of tension applied to the film web regardless of the diameter of the film supply roll.

In this film tensioning means, both the film supply roll and the idler roller each have one of their ends fixed for rotation to the frame of the apparatus. The opposite ends of these two rollers include pneumatically actuatable elements which apply resistance to the film supply roll. This resistance controls the rate at which the film pays out from the supply roll and moves the idler roller as needed near to or away from the film driving means to increase or decrease the film tension.

In a still further aspect of the present invention, the idler roller and film supply roll are operatively interconnected by pneumatic means so that as the idler roller moves near to or away from the film driving means, air pressure is selectively supplied to or bled off from a film supply roll braking element.

In still another principal aspect of the present invention, an assembly is provided for producing a transverse seal on the front and rear ends of the foam cushion bags as they pass through the apparatus. This seal assembly includes a roller member extending across the travel path of the film, a resistance wire which extends across the travel path of the film and a seal bar which is aligned with the roller member and resistance wire. The film web is interposed between the roller member, resistance wire and the seal bar so that the seal bar may be selectively actuated to bring the resistance wire into contact with the film and against the roller member to seal the top of a bag exiting apparatus, cut that bag loose from the film web and seal the bottom of a successive bag exiting the apparatus.

In yet another principal aspect of the present invention, means are provided for forming a seal along one or more of the lengths of the web of film at the marginal edges thereof. This sealing means includes two members which clamp an edge of the film. Hot air is fed to one of the clamping members and against the film held therebetween to effect a seal between the opposing film panels at the edge. The other of the two clamping members is provided with a plurality of heat dissipating members, typically in the form of fins, so that this other clamping member consistently remains cool, at a temperature lower than the melting temperature of the film, in order to prevent ribbon cutting of the film at the marginal edges. The flow of heated air to this sealing means may be periodically interrupted to create a vent so that gases formed in the foam reaction may escape from within the cushion bag.

These and other objects, features, and advantages of the present invention will be clearly understood through a consideration of the following detailed description wherein like reference numerals refer to like parts.

BRIEF DESCRIPTION OF THE DRAWINGS

In the course of this detailed description, reference will be made frequently to in which:

FIG. 1 is a perspective view of one embodiment of a foam-cushion-making apparatus constructed in accordance of the principles of the present invention;

FIG. 2 is a frontal sectional view of the apparatus of FIG. 1 taken along lines 2—2 thereof.

FIG. 3 is a perspective view of the apparatus of FIG. 1 with the cover removed illustrates a protective foam cushion being made and the path of travel of the plastic film;

FIG. 4 is a sectional view of the apparatus of FIG. 2 taken along lines 4—4 thereof;

FIG. 5 is a sectional view of the apparatus of FIG. 2 taken along lines 5—5 thereof;

FIG. 6 is an elevational view of the foam dispensing assembly used in the apparatus of FIG. 1 with the front film driving roller removed for clarity;

FIG. 7 is an end view of the foam dispensing assembly of FIG. 6 taken along lines 7—7 thereof;

FIG. 8 is a sectional view of a nozzle used in the foam dispensing assembly of the apparatus of FIG. 1;

FIG. 9 is a sectional view taken through the film driving means illustrating the orientation of the foam dispensing assembly, the brush rollers and the film web and further depicting the flexible mixing chamber of the apparatus;

FIG. 10 is a plan view of a protective foam cushion made by the apparatus of FIG. 2;

FIG. 11 is a partial schematic view of the film tensioning means utilized in the apparatus of FIG. 1 which operatively interconnects the film supply roll, shown in cross-section, with the film guide roller;

FIG. 12 is a sectional plan view of the edge seal assembly used in the apparatus of FIG. 1;

FIG. 16 is a perspective end view of a brush roller used in the apparatus of FIG. 1;

FIG. 17 is a perspective view of an alternate film driving roller used in an alternate embodiment of the present invention;

FIG. 18 is a sectional schematic view of a third embodiment of the present invention; and, FIG. 19 is a schematic view of the nozzle end of the foam dispensing assembly of the apparatus of FIG. 2.

DETAILED DESCRIPTION OF THE PREFERRED EMBODIMENTS

Figure 13:
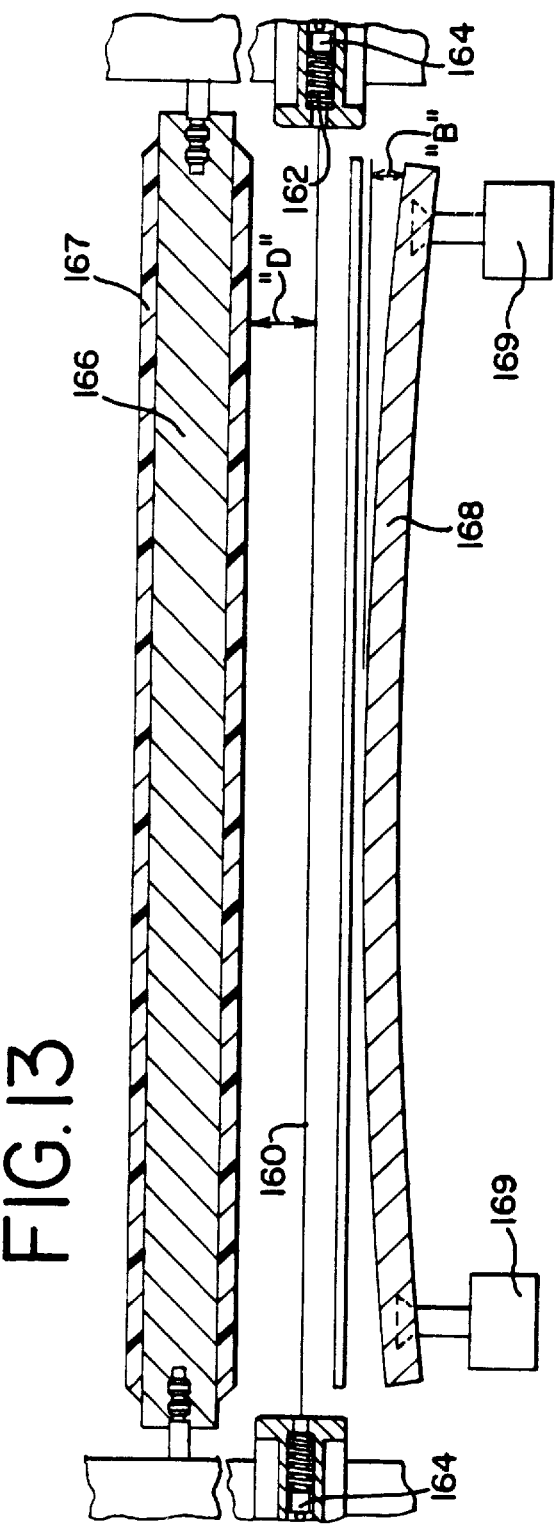
FIG. 13 is a sectional view of the apparatus of FIG. 4, taken along lines 13—13 thereof, illustrating the film crosscut seal assembly of the present invention.

Referring now to the drawings, and in particular, FIGS. 1–7, a preferred embodiment of a foam cushion-making apparatus 50 incorporating the principles of the present invention is shown mounted on an upstanding support 52 which includes a vertical stanchion 54 rising upwardly from a multi-leg base 56. The stanchion 52 supports an apparatus frame 58, which in turn supports the various functional components of the apparatus 50 within an exterior protective housing 60. The apparatus 50 is useful in producing protective foam cushions 62 in which a mass of expandable foam 64, such as a urethane or polyurethane foam, is enclosed within an outer plastic film 66 which takes the form of an envelope or bag 68.

As shown in greater detail in FIG. 10, the outer bag 68 which envelopes the foam cushion 62 may take a rectangular or square configuration. The plastic film 66 used for the bag 68 is folded upon itself at a general centerline 69 thereof to define a partial envelope in which two opposing panels 70, 71 of the plastic film 66 confront each other. When produced by apparatus 50 of the present invention, the foldline 69 of the bag 68 occurs along the length L of the bag 68 at one marginal edge 72 thereof, The other lengthwise marginal edge 73 is provided with an edge seal 74, while the leading and trailing edges 76, 77 (which extend transversely along the width W of the bag) are sealed when the bag is cut from the plastic film 66 which is supplied to the apparatus 50 from a film supply roll 78 rotatably mounted on the lower portion 59 of the frame 58 underneath the housing 60 and containing a continuous web 80 of film 66.

The film 66 is supplied to the apparatus 50 as a continuous web 80 and passes over a film guide roller 82 rotatably mounted within the frame 58 and into engagement with a film driving means 85 which drivingly engages the film 66 and advances it through the apparatus 50. A foam dispensing assembly 86, is mounted within the housing 60 adjacent the film driving means 85 so that it is interposed between the opposing film panels 70, 71. The apparatus 50 further includes means for sealing together the open edges 73, 76 & 77 of the plastic film 66 which includes an edge seal assembly 88 and a crosscut seal assembly 90, which respectively seal the open marginal edges 73 and transverse edges 76, 77 of the film 66 as it advances through the apparatus 50.

Film Driving Means

Turning now to FIGS. 3–5, the details of the film driving means 85 are shown and will now be described. It can be seen that the film driving means 85 includes a pair of elongated, circular film driving members 92, 93 which extend between the sidewalls 61 of the apparatus housing 60. The film driving members 92, 93 include a driving member 90 and a driven member 92 that are driven by an electric motor 96. Gears 98, 99 are mounted on respective shafts 104, 105 of the film driving members 92, 93 and are intermeshed together so that when drive is applied to the driving member by way of the motor 96, the gears effect a like rotation in both the driving and driven members 92, 93.

As will be explained in greater detail below, it is preferable that the film driving members 92, 93 take the form of pliable rollers, and most preferably brush rollers 100. As shown in FIG. 16, the brush rollers 100 may include a base sleeve 102 that receives respective shafts 104, 105 and which may be held in place by a positioning collar 129. The rollers have a plurality of brush elements 106, in the form of fibers, hairs, bristles and the like which extend radially outwardly therefrom. Synthetic or natural materials may be used for the brush elements 106. These brush elements 106 are an important departure from prior art foam cushionmaking apparatus in that they serve not only to assist in the mixing of the cushioning foam components, but also assist in ensuring alignment and coplanarity of the opposing film panels 70, 71 of the film web 80 as it passes through the film driving means 85. The brush rollers 100 may utilize antistatic material as the composition for its brush elements to decrease the occurrence of any static cling occurring with the film panels 70, 71.

Foam Dispensing Means

In one important aspect of the present invention, the foam dispensing assembly 86 takes the form of a foam dispensing gun 108 that extends for substantially the entire length of the film driving means 85 and is disposed adjacent thereof. The foam dispensing gun 108 serves to supply two streams 110, 111 of foam reactive components, also known as foam precursors, to the interior space 75 of the film web 80 between the two opposing film panels 70, 71 thereof. In a significant departure from prior art foam cushion-making apparatus, there is no mixing chamber disposed in line within the foam dispensing gun 108. Rather, the foam dispensing gun 108 includes two separate foam component supply tubes 112, 114 which are spaced apart from each other and held in place by one or more spacers 116.

The foam component supply tubes 112, 114 extend for the length of the film driving means 85 to a point near the folded centerline 69 of the film 66 and then extend downward toward the film driving means 85. The supply tubes each terminate in foam dispensing nozzles 116 & 118. The nozzles 116, 118 are preferably replaceable and may include as illustrated in FIG. 8, a hollow passage terminating in an orifice 123. The other ends of the nozzles may be threaded, as at 127, to provide an aspect of interchangeability and quick replaceablility.

As shown best in FIGS. 6 & 19, one of the foam component supply tubes 112 extends vertically while the other foam component supply 114 extends at an angle thereto so that imaginary lines drawn along the longitudinal axes $L_1$, $L_2$ of the nozzles 116, 118 intersect together so that the two streams of foam components 110, 111 contact each other after they exit the dispensing nozzles 116, 118. The foam dispensing gun 108 includes a gun block 109 which contains two valves 126, 128 which control the flow of foam components which enter the gun 108 under pressure from a pressurized supply of same (not shown). The gun block 109 may also include in-line heaters 115 to heat the reactive foam component streams 110, 111 to prevent any cold shot from occurring which affects the chemistry which might result in less than optimally mixed and reacted foam components.

The foam dispensing gun 108 further includes a vacuum tube 120 which leads to a vacuum sensing block 122. The vacuum tube 120 is connected to a source of negative air pressure (not shown) and draws a slight constant vacuum on the two opposing film panels 70, 71 by way of two vacuum ports 124, 125. This vacuum draws the film panels 70, 71 passing over the foam dispensing gun 108 into contact with the vacuum ports 124, 125 and thereby provides a means for detecting the presence of the film web 80 in proximity to the foam dispensing gun nozzles 116, 118. When the negative air pressure is maintained such as when the plastic film web 80 is passing over the gun 108 and its vacuum ports 124, 125, a signal is sent to a programmable logic controller (PLC) which in turn sends a signal to the foam dispensing gun 108 to actuate the foam dispensing valves 126, 128 of the gun to maintain it in a "firing" state where it dispenses the two streams of the reactive foam components 110, 111 into the interior space 75 between the opposing film panels 70, 71. When either of the vacuum ports 124, 125 draws a positive pressure such as will occur when the plastic supply roll 78 is exhausted or if a tear should occur in the bag film 66, a signal is sent to the PLC which closes the gun valves 126, 128. This condition also occurs when the gun 108 is tilted out of its operational position above the apparatus 50. This system thus prevents injection of foam components into the nip 130 of the rollers 92, 93 unless a whole film 66 is present to provide a mixing chamber 132.

The foam dispensing assembly 86 also includes a film engagement member, in the form of a spacer 119 which is positioned on the outboard edge of the one foam component supply tube 112. This spacer 119 preferably includes an exterior radius 121 which engages the foldline or centerline 69 of the plastic film 66. This spacer 119 assists in aligning the free film edges 73 together and spaces the gun nozzles 116, 118 and point of foam injection from the edge 69 of the film 166.

Foam Mixing Chamber

As mentioned above, the present invention does not rely upon an in-line mixing chamber in place within the foam dispensing gun 108, but rather, the nozzles 116, 118 of the gun 108 extend into the film driving means 85, more specifically, into the nip 130 which occurs between the driving members 92, 93. As shown in FIGS. 6 & 9, wherein the film driving members 92, 93 are depicted as brush rollers 100, the nozzles 116, 118 are positioned approximately at the centerline C of the rollers 92, 93. When the nozzles 116, 118 are positioned between the rollers 92, 93, it has been found that the foam reactive components effectively mix together and react to form an expandable foam (FIG. 9). The mixing of these two foam components occurs in what I characterize as a "flexible" mixing chamber 132, which is defined in part by the opposing film panels 70, 71 and particularly the interior surfaces thereof. The rollers 92, 93 assist in the mixing in that they exert pressure on the film panels 70, 71, that define the walls of the mixing chamber 132. The rollers 92, 93 therefore not only facilitate the mixing of the foam components, but also provide support for the film panels 70, 71 during expansion of the foam mass 64 during the initial reaction phase of the foam components 110, 111.

It is believed that the mixing occurs primarily at the centerline C of the nip, or interference chord 130 where the two rollers 92, 93 meet and press against each other, and below it. The pressure which the two rollers 92, 93 exert on the film panels 70, 71 is greatest at the nip 130, and in particular at the centerline C thereof. This pressure advantageously creates a low pressure seal on the film web 80 as it passes through the rollers 92, 93 which also facilitates mixing because it prevents backpressure of the foam developed during reaction and expansion from driving the expanding foam above the rollers. As a result of this pressure seal, the foam may be delivered at higher delivery pressures than were heretofore possible, in the area of about 20 lbs per minute.

It will then be understood that the combination of the pliable rollers 92, 93 and the opposing film panels 70, 71 uniquely defines a flexible mixing chamber 132 wherein the film panels 70, 71 define the walls of the mixing chamber at the level of the film driving means 85 and define the exterior walls of the protective foam cushion 62 at a level downstream of the film driving means. The pliable rollers 92, 93 support the walls of the mixing chamber, i.e., the opposing film panels 70, 71 as well as assist in the mixing of the foam component streams 110, 111 together. Advantageously, when brush rollers 100 are used as the pliable rollers 92, 93, the brush elements 106 have been found to provide an additional advantage in that they impart a straightening effect on the film panels 70, 71 as well as provide a positive engagement with the film web 80. As shown in FIG. 17, the pliable rollers 92, 93 may also utilize a soft, deformable outer covering 134, formed from a suitable material such as an open cell polyurethane or foamed neoprene where the natural exterior curvatures of the two rollers 92, 93, meet and compress against each other at the nip or interference chord 130 of the rollers. Should such a pliable covering be used for the rollers 92, 93, it may be necessary to provide drive surfaces, such as pinch rollers, at the ends of the rollers to ensure advancement of the film.

It will be further understood that although two types of supports for the flexible mixing chamber 134 are described herein in detail, inasmuch as the flexible mixing chamber 134 is defined mostly by the opposing film panels 70, 71, means other than the rollers of the film driving means may be used to support the film 66. Such an alternate embodiment is schematically depicted in FIG. 18 and explained in greater detail below and wherein the film 66' passes between two rigid supports in the form of blocks 200, 201 defining a passage into which foam component streams 110, 111 are injected from the foam dispensing gun 108'.

Film Tensioning Means

The present invention also provides a film tensioning means in order to consistently maintain a desired amount of tension on the film web during advancement. This tensioning means operatively interconnects together the film supply roll 78 which holds the film web 80 and the film guide roller 82. This operative interconnection is effected primarily by way of a pnuematic coupling 140 which includes air tubes 141 that link the film supply roll 78 together with the film guide roller 82 at the top of the apparatus frame 58. As shown in FIGS. 2 & 11, the film supply roll 78 is held in place on the lower portion 59 of the apparatus frame 58. The supply roll 78 is fixed for rotation in the frame 58 at one end 142 of the supply roll 78 and engages at its opposite end 144, what may be aptly characterized as an air braking assembly 146 which selectively applies a braking, or axial resistance force $F_T$, to the film supply roll 78. This air brake assembly 146 includes a shaft 147 having a tapered, central hub portion 148 and a flat piston face 150 opposite thereof. The shaft 147 is held within and is displaceable within a cylindrical housing 149 in response to fluid pressure, such as air pressure, exerted thereagainst. Such fluid pressure causes the assembly 146 to displace longitudinally within the housing 149. When air pressure is supplied to the housing 149 through an air orifice 152, the tapered hub 148 is pressed against the face of the core 79 of the film supply roll 78 to thereby apply a resistance force to the film supply roll 78.

The pneumatic coupling 140 also supplies positive air pressure to the engagement end 83 of the upper film guide roller shaft 84 to maintain an appropriate tension on the edge 73 of the plastic film 66 in the area of the edge seal 74 thereof. This shaft end 83 is held in a tension valve block 151 and has a load applied to it by a load spring 152 which exerts a spring force $F_S$ against an engagement end 83 of the film guide roller 83. This load spring 152 holds a seal member 154 against an air orifice 156 aligned therewith in the tension valve block 151. Air pressure through the pneumatic coupling 140 applies an air pressure force $F_A$ which maintains a static condition on the film guide roller shaft engagement end 83 which approximates the spring force that the load spring 152 applies to the shaft end 83. In this state, it maintains an axial pressure on the film supply roll 78 due to air pressure impacting against the piston face 150 of the air brake assembly 146 which increases the resistance to the film supply roll paying out the continuous web 80.

When the film tension in the web 80 reaches too high a level as it unwinds from the film supply roll 78, the tension applies a downward force, $F_f$ on the upper film guide roller 82. This downward force causes the film guide roller 82 to move slightly downwardly at its movable end 83 against the load spring 152. As the load spring 152 compresses, the seal member 154 disposed on the shaft engagement end 83 breaks its sealing engagement with the air orifice 156 and thereby bleeds off air pressure from the coupling 140 at a rate greater than the air supplied to the tensioning system, thereby lowering the air pressure in the film supply roll air braking assembly 146. The air then escapes from the housing 149 thereof and releases the axial force which the tapered hub 148 applies against the supply roll 78 and so reduces the tension on the film 66. This tensioning means is advantageously aligned with the open edges of the film panels 70, 71 where the edge seal of the foam cushion bags 62 are formed.

Film Crosscut Seal Means

Figure 15:
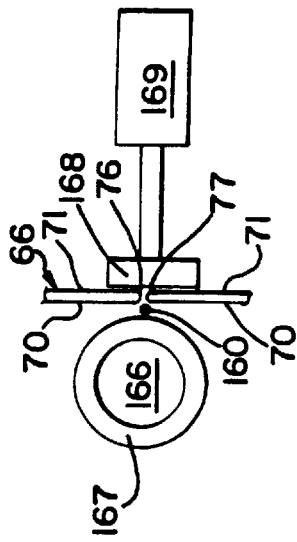
FIG. 15 is the same view as FIG. 14 illustrating the assembly in an operative condition making a cut in the film web.
Figure 14:
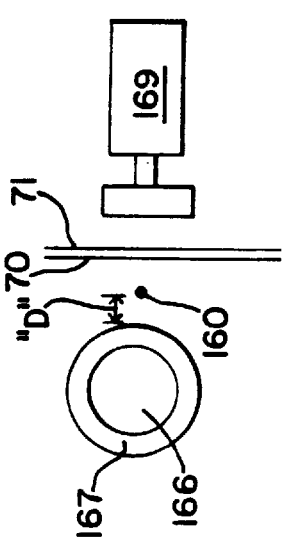
FIG. 14 is a schematic view of the crosscut assembly of FIG. 13 illustrating the assembly in a static condition as the film web passes through the apparatus.

Turning now to FIGS. 13–15, the details of the crosscut seal assembly 90 used with the apparatus 50 are shown. This assembly 90 cuts the film envelope in a crosswise, or transverse manner preselected between successive foam cushion bags 68 intervals corresponding to any predesired length of foam cushion bag. As illustrated in FIGS. 4 & 5, the crosscut seal assembly 90 is disposed within the apparatus housing 60 at a level beneath the film driving means 85. The assembly 90 includes an electrical heating wire 160 which extends lengthwise between the sidewalls of the housing 60 and frame 58. The wire 160 is held under tension by two springs 162 which engage it via retainers 164 applied to opposite ends of the wire 160. The wire 160 is positioned in alignment with a roller 166 having a Teflon outer sleeve 167 disposed thereon and the wire 160 is further spaced apart from the surface of the sleeve 167 a predetermined distance "D". A crosscut bar 168 is mounted in alignment with the wire 160 and the roller 167 and preferably at the same level therewith. This bar 168 is mounted on two air cylinders 169 and has a preformed bow in it such that the ends 170 of the bar 168 curve slightly rearwardly from the center 171 of the bar 168. The displacement of this bow is shown at "B" and it permits an equal force to be applied to the plastic film 66 as it passes through the assembly 90 so that a reliable crosscut seal is effected and an equal force is applied to "sandwich" the plastic film 66 between the bar 168 and the heating wire 160 and roller 166 as shown in FIG. 15. Preferable results have been obtained using a bow of approximately 0.375 inch. The seal so formed defines the trailing edge 77 of the foam cushion completed by the apparatus 50 while also forming the leading edge 76 of the next foam cushion 62.

Film Edge Sealing Means

FIG. 12 illustrates, in section, the details of a film edge seal assembly 88 which is used to form an edge seal 74 along the marginal edges 73 of the film 66 opposite the film centerline 69. This assembly 88 includes a heater tube 175 which houses an electrical heater element 176. Hot air is blown into the hollow core 178 of the heater tube 175 and is directed against the film 66 by way of a small gauge needle 180. The hot air is directed onto the film 66 and onto a rear seal bar 182, preferably formed from a thermally conductive material, such as aluminum. A corresponding counterpart front seal bar 184 is disposed in alignment with the rear seal bar 182 at the free edge 73 of the film 66. Importantly, the front seal bar 184 is also formed from a thermally conductive material, such as aluminum, and has a plurality of heat dissipating fins 186 formed thereon to form a heat sink for the edge seal assembly 88.

Hot air is supplied through the heater tube 175 and the flow of this heated air is controlled by a solenoid operated valve 187. The air is delivered at a constant temperature of about 700° F. However, the heat dissipating fins 186 of the front seal bar 184 maintain it in a "cool" state, that is, below the melting temperature of the film. This effectively prevents the plastic film 66 from sticking to the edge seal assembly components and also prevents the hot air from cutting a ribbon of film from the edge 73 of the film.

The two edge seal bars 182, 184 further cooperate to apply a flat pressure on the film edge 73 which reinforces the newly made edge seal 74. The film edge seal assembly 88 is also used to form a vent 190 in the foam cushion bags 68 in order to permit the escape of gases formed during the foam reaction process. This may be done by intermittently turning the solenoid valve 187 which controls the airflow off. When the airflow is turned off, no edge seal 74 will be formed at the edge 73. This permits the vent 190 to be formed at any location along the edge 73 of the bag 68. Preferable results have been obtained by placing the vent in the center of the edge 73 as shown in FIG. 1.

The apparatus of the present invention may also take the form of an alternate embodiment 50' shown in FIG. 18, where the plastic film 66' is fed to the apparatus 50' as two separate webs, or film panels 70', 71' which are sealed together at their opposing edges by an appropriate means. The panels 70', 71' may be fed by conventional drive rollers 92', 93' over a foam dispensing assembly 86' and into a passage or opening 200' formed in part by two rigid support members in the form of support blocks 202', 203' which provide support for the film panels 70', 71'. The foam components (only one such stream 110' and nozzle 116' being shown for purposes of clarity) are injected under pressure into the interior space 75' between the two film panels 70', 71' which define a mixing chamber 134' that is supported by the support members 202', 203'. Mixing and reacting of the foam takes place in the chamber 134' to produce foam cushions. A suitable crosscut seal assembly 90' may be provided to effect the necessary crosscut seals on the cushion bags. In order to resist the foam backpressure caused during reacting, the support members 202', 203' may have opposing lips 205'.

Therefore, it will be understood that the present invention advantageously provides a foam-in-place apparatus which does not require a separate in-line mixing area which needs to be taken apart to be cleaned. The nozzle placement and design of the present invention removes the foam dispensing parts from the gun assembly and positions them into the bag which envelops the foam cushion. This structural arrangement increases the reliability of the apparatus and leads to virtually flawless foam dispensing.

While the preferred embodiments of the invention have been shown and described, it will be obvious to those skilled in the art that changes and modifications may be made therein without departing from the spirit of the invention, the scope of which is defined by the appended claims.

I claim:

1. An apparatus for successively forming foam cushions from first and second reactive foam components that when mixed together form an expandable foam and from two opposing flexible panels that enclose the expandable foam, the apparatus comprising:

a supply of two flexible panels disposed in opposition to each other;

means for driving said two flexible panels through said apparatus along a designated feed path;

a foam dispensing assembly disposed along the apparatus feed path and interposed between said two flexible panels, the foam dispensing assembly dispensing separate amounts of said first and second reactive foam components into an interior space between said two flexible panels;

said two flexible panels defining a flexible mixing chamber therebetween in which said first and second reactive foam components dispensed from said foam dispensing assembly are mixed together to form said expandable foam, the flexible mixing chamber being disposed along said apparatus feed path exterior of said foam dispensing assembly, said two flexible panels defining opposing walls of said flexible mixing chamber within said apparatus when said two flexible panels are disposed within said apparatus and defining walls of said foam cushion when said two flexible panels are exterior of said apparatus.

2. The apparatus of claim 1, wherein said foam dispensing assembly includes first and second foam-dispensing nozzles extending between said two flexible panels, said foam dispensing assembly further including first and second means for selectively supplying said first and second foam reactive components respectively to said first and second foam-dispensing nozzles.

3. The apparatus of claim 2, wherein said foam dispensing assembly two nozzles are aligned together so that two imaginary lines drawn along respective longitudinal axes of said two nozzles intersect.

4. The apparatus of claim 1, wherein said two flexible panels are formed from a continuous web of flexible film folded upon itself in face-to-face contact.

5. The apparatus of claim 1, wherein said flexible panel driving means at least partially supports said flexible mixing chamber and said flexible panel driving means includes a driving roller and a driven roller disposed on opposite sides of said two flexible panels.

6. The apparatus of claim 5, wherein at least one of said driving and driven rollers is a brush roller having a plurality of fibers extending radially outwardly therefrom along a predetermined length of said one roller.

7. The apparatus of claim 5, wherein said foam dispensing assembly includes first and second foam-dispensing openings associated with respective first and second supplies of said first and second reactive foam components, the first and second foam-dispensing openings being positioned between said driving and driven rollers at a centerline of said driving and driven rollers.

8. The apparatus of claim 1, wherein said flexible panel driving means includes two counter-rotating brushes contacting exterior surfaces of said flexible panels, said rotation thereof providing an action which assists in mixing said first and second reactive foam components within said flexible mixing chamber.

9. The apparatus of claim 2, wherein said first and second foam-dispensing assembly nozzles include respective first and second dispensing openings which are positioned downstream of a centerline of said flexible panel driving means.

10. The apparatus of claim 1, further including means for sealing together common side edges of said film panels to form side edges of said foam cushions.

11. The apparatus of claim 10, wherein said edge sealing means includes a pair of opposing edge seal members separated by an intervening sealing passage through which said two flexible panels are driven by said film driving means, one of said pair of edge seal members providing a heated surface which contacts said film panels and the other of said pair of edge seal members having means for cooling said flexible panels.

12. The apparatus of claim 2, further including a sensor for detecting presence of said flexible panels in an operative position upstream of said foam-dispensing nozzles, said sensor being operatively connected to said first and second reactive foam component supplies, said sensor stopping supply of said first and second reactive foam components to said foam-dispensing nozzles upon detecting a lack of presence of said flexible panels in said operative position.

13. The apparatus of claim 5, wherein said foam-dispensing assembly includes first and second foam-dispensing openings that respectively dispense said first and second reactive foam components into said flexible mixing chamber, first and second foam-dispensing openings being disposed between said driving and driven rollers.

14. The apparatus of claim 13, wherein said first and second foam-dispensing openings are disposed proximate to a common centerline of said driving and driven rollers.

15. The apparatus of claim 1, further including means for cutting said two flexible panels and forming a transverse seal to define respective body and trailing edges of successive foam cushions.

16. In an apparatus for making foam cushions by injecting a mass of expandable foam between two opposing panels of flexible film, the apparatus having means for driving said opposing film panels along a feedpath of said apparatus, the improvement comprising:

the combination of: (1) a foam dispensing assembly disposed along said apparatus feedpath for dispensing two separate, reactive foam components between said opposing film panels in two separate, reactive foam component streams that intersect together; and, (2) a flexible, moving mixing chamber located at said foam dispensing assembly and downstream thereof, the flexible mixing chamber being defined at least in part by opposing film panels.

17. The apparatus as set forth in claim 16, wherein said opposing film panels define inner walls of said flexible mixing chamber when said opposing film panels are interior of said apparatus and define outer walls of said foam cushions exterior of said apparatus.

18. The apparatus as set forth in claim 16, wherein said flexible mixing chamber is at least partially supported by two counter-rotating rollers disposed on opposite sides and exterior surfaces of said two opposing film panels.

19. The apparatus as set forth in claim 18, wherein said two rollers include a driving roller and a driven roller.

20. The apparatus as set forth in claim 18, wherein said two rollers include a pair of brush rollers.

21. The apparatus as set forth in claim 16, wherein said two opposing film panels cooperatively define a width of said foam cushion bags and said apparatus further includes means for supporting said flexible mixing chamber in the form of two confronting support members disposed on opposite sides of said opposing film panels and extending for the entire width of said foam cushion bags.

22. A sealing assembly for use in a foam cushion-forming apparatus that successively forms foam cushions from two opposing flexible panels that define an interior space therebetween which is filled with a cushioning foam by a foam dispensing assembly, said two opposing film panels being driven along said travel path and through said apparatus by an associated film driving means, the sealing assembly comprising:

a pair of opposing edge seal members separated by an intervening sealing passage through which common side edges of said opposing film panels are driven by said film driving means, a source of heated air directed against said opposing film panels along one of said two edge seal members, and the other of said pair of edge seal members having means for cooling said opposing film panels.

23. The sealing assembly as claimed in claim 22, wherein said side seals are formed along longitudinal edges of said film web and said film panel cooling means is disposed in opposition to said heated air source.

24. The sealing assembly as claimed in claim 22, wherein said opposing edge seal members include two clamping members that extend over said common side edges of said film web.

25. The sealing assembly as claimed in claim 24, wherein one of said clamping members includes a heat sink portion for cooling said common side edges of said opposing film panels.

26. The sealing assembly as claimed in claim 25, wherein said heat sink portion includes a plurality of fins formed on one of said two clamping member and which extend away from said intervening sealing passage, and said heated air source is blown through a tube that extends through the other of said two clamping members.

27. The sealing assembly as claimed in claim 22, wherein said source of heated air includes an elongated hollow member having a heating element disposed therein, said hollow member defining an air reservoir, said air reservoir communicating with said one edge seal member.

28. The sealing assembly as claimed in claim 22, further including means for interrupting flow of heating air directed against said opposing film panels to thereby create an unsealed portion in said edge seal that serves as a vent which permits escape of gasses associated with dispensing of said foam into said interior space.

29. The sealing assembly as claimed in claim 28, wherein said heated air flow interrupting means includes a valve operatively associated with said heated air source.

30. A film tensioning assembly for tensioning a flexible film supply used in an apparatus for successively forming foam cushions useful in packaging of products, wherein each foam cushion is formed from two opposing flexible film panels drawn from a supply of flexible film associated with said cushion-forming apparatus, the supply of film including a continuous film web, the film web being driven through said apparatus by an associated film web driving means, said apparatus further including a foam dispensing assembly interposed in a travel path of said film web for dispensing reactive foam components between said two opposing flexible film panels thereof, the film tensioning assembly comprising:

means for applying a predetermined amount of tension to said film web as it passes through said apparatus and including a first biasing member which selectively applies a first resistance force to said film supply and a second biasing member which selectively applies a second resistance force to a film guide member interposed in said film travel path between said film panel supply and said film web driving means.

31. The film tensioning assembly of claim 30, wherein said first and second biasing members are operatively connected together such that first and second resistance forces are respectively simultaneously applied to said film supply and said film guide member.

32. The film tensioning assembly of claim 30, wherein said first and second biasing members are pneumatically coupled together.

33. The film tensioning assembly of claim 32, further including a hollow roller rotatably supporting said film supply, the roller having first and second opposing ends, the first end thereof being rotatably mounted on said apparatus and the second end thereof being rotatably mounted to said first biasing member.

34. The film tensioning assembly of claim 33, wherein said film guide member includes a second roller rotatably mounted to said apparatus, and said second biasing member selectively engaging said second roller.

* * * * *